(12) United States Patent
Braun et al.

(10) Patent No.: US 12,431,822 B2
(45) Date of Patent: Sep. 30, 2025

(54) SMART MOTOR SYSTEMS AND METHODS USING LOCAL INTELLIGENCE

(71) Applicant: LEGGETT & PLATT CANADA CO., Halifax (CA)

(72) Inventors: Thomas Braun, Heroldsberg (DE); Caitlin Nicole Vicary, Sarnia (CA); Milosz Niec, Tecumseh (CA)

(73) Assignee: LEGGETT & PLATT CANADA CO., Halifax (CA)

( * ) Notice: Subject to any disclaimer, the term of this patent is extended or adjusted under 35 U.S.C. 154(b) by 0 days.

(21) Appl. No.: 18/393,139

(22) Filed: Dec. 21, 2023

(65) Prior Publication Data

US 2024/0128899 A1    Apr. 18, 2024

Related U.S. Application Data

(63) Continuation of application No. 17/810,129, filed on Jun. 30, 2022, now Pat. No. 11,894,794.

(Continued)

(51) Int. Cl.
*H02P 6/08*    (2016.01)
*H02P 23/14*    (2006.01)

(52) U.S. Cl.
CPC ............... *H02P 6/08* (2013.01); *H02P 23/14* (2013.01)

(58) Field of Classification Search
CPC .... H02P 6/08; H02P 23/14; H02P 5/00; H02P 29/024; H02P 29/60; H02P 6/17;

(Continued)

(56) References Cited

U.S. PATENT DOCUMENTS

| 5,390,351 A | 2/1995 | Di Giulio et al. |
| 5,420,485 A | 5/1995 | Campbell, Jr. |

(Continued)

FOREIGN PATENT DOCUMENTS

| CN | 111752531 A | 10/2020 |
| DE | 102004047165 A1 | 4/2006 |

(Continued)

OTHER PUBLICATIONS

International Search Report and Written Opinion for Application No. PCT/CA2022/051051 dated Oct. 7, 2022 (7 pages).

(Continued)

*Primary Examiner* — David Luo
(74) *Attorney, Agent, or Firm* — Michael Best & Friedrich LLP

(57) ABSTRACT

A smart motor includes a motor, a memory, and an electronic processor connected to the motor and the memory. The electronic processor executes a software stack including a hardware layer, an operating layer, and an application layer. The hardware layer provides input/output operations between the motor and the electronic processor. The operating layer provides an intermediary between the hardware layer and the application layer. The application layer executes functions stored in the memory to communicate with and control the hardware layer. Further, the hardware layer, the operating layer, and the application layer selectively control operation of the motor based on one or more signals received from an input device.

19 Claims, 19 Drawing Sheets

Related U.S. Application Data

(60) Provisional application No. 63/217,201, filed on Jun. 30, 2021.

(58) Field of Classification Search
CPC ... H02P 5/46; H02P 6/04; H02P 23/22; G05B 19/042; H04L 12/40
USPC .............................. 318/400.09, 400.01, 700
See application file for complete search history.

(56) References Cited

U.S. PATENT DOCUMENTS

| | | | |
|---|---|---|---|
| 5,452,419 | A | 9/1995 | Di Giulio et al. |
| 6,369,536 | B2 * | 4/2002 | Beifus ..................... H02P 6/08 318/567 |
| 7,017,861 | B1 | 3/2006 | Johansson et al. |
| 7,143,301 | B2 | 11/2006 | Pearce et al. |
| 7,182,273 | B2 | 2/2007 | Proulx, Jr. |
| 7,308,322 | B1 | 12/2007 | Discenzo et al. |
| 8,457,846 | B2 | 6/2013 | Fischer et al. |
| 9,092,030 | B2 * | 7/2015 | Weiss ..................... H02P 31/00 |
| 9,607,780 | B2 | 3/2017 | Connell |
| 9,712,102 | B2 * | 7/2017 | Lee ......................... G06F 8/654 |
| 9,776,331 | B2 | 10/2017 | Yu et al. |
| 10,230,322 | B2 * | 3/2019 | Peng ................... H02P 29/0241 |
| 10,814,805 | B2 | 10/2020 | White |
| 2005/0206332 | A1 | 9/2005 | Shimizu |
| 2008/0136614 | A1 | 6/2008 | Ran |
| 2012/0056572 | A1 | 3/2012 | Bigler et al. |
| 2015/0012140 | A1 | 1/2015 | Fang et al. |
| 2017/0048309 | A1 | 2/2017 | Fischer et al. |
| 2019/0263533 | A1 | 8/2019 | Nierlich et al. |
| 2019/0379314 | A1 | 12/2019 | Sato et al. |
| 2020/0276949 | A1 | 9/2020 | Baudu et al. |

FOREIGN PATENT DOCUMENTS

| | | |
|---|---|---|
| JP | 2004072870 A | 3/2004 |
| JP | 2004357473 A | 12/2004 |
| KR | 101295956 B1 | 8/2013 |
| KR | 20180056941 A | 5/2018 |
| WO | 2019120493 A1 | 6/2019 |
| WO | 2019219508 A1 | 11/2019 |

OTHER PUBLICATIONS

Turntide. Turntide Smart Motor System Brochure. Version 16. Available online at https://turntide.com/resource-hub/turntide-smart-motor-system-onesheet/. Accessed on Oct. 12, 2023 (3 pages).
Japanese Patent Office Action for Application No. 2023580370 dated Apr. 2, 2025 (7 pages including English translation).
European Patent Office Extended Search Report for Application No. 22831112.2 dated Mar. 25, 2025 (9 pages).
Rylander & Wallin, "Lin - Local 7 Interconnect Bus", Master's Thesis Chalmers University of Technology Goteborg, Jan. 1, 2003 (Jan. 1, 2003), pp. 19-30 (12 pages).
Korean Patent Office Action for Application No. 1020237045003 dated May 7, 2025 (61 pages including English translation).
Eric Hackett, "Application Note LIN Protocol and Physical Layer-Requirements," TI, 2018 (14 pages).
"Development of Embedded SW Platform for Future Intelligent Vehicle," ETRI, 2012 (231 pages including Statement of Relevance).

* cited by examiner

| | Frame | ID | Parity | PID | 1.D-Byte | 2.D-Byte | 3.D-Byte | 4.D-Byte | 5.D-Byte | 6.D-Byte | 7.D-Byte | 8.D-Byte |
|---|---|---|---|---|---|---|---|---|---|---|---|---|
| 905 | WR_Data | 0x21 | 0x01 | 0x61 | NAD | MCMD | 1) | 1) | 1) | 1) | ▨ | ▨ |
| 910 | RD_Data_Req | 0x22 | 0x11 | 0xE2 | NAD | MCMD | 4) | | | | | |
| 915 | RD_Data | 0x23 | 0x10 | 0xA3 | RNAD | RMCMD | 2) | 2) | 2) | 2) | SST | |
| 1320 | GoToSleep_CMD | (0x3C) 0x37 | 0x00 | 0x3C | 0x00 | 0xFF | 0xFF | 0xFF | 0xFF | 0xFF | 0xFF | 0xFF |
| 1330 | ECUReset_CMD | (0x3C) 0x38 | 0x00 | 0x3C | NAD | 0x01 | 0x11 | RType | 0xFF | 0xFF | 0xFF | 0xFF |
| 1340 | ECUReset_Response | (0x3C) 0x39 | 0x01 | 0x7D | RNAD | 0x01 | 3) | RType | 0xFF | 0xFF | 0xFF | 0xFF |

Legend 1310

| | |
|---|---|
| NAD | Node-address - Address Of Motor-device| (0x01 0x3F =63 Devices Max.) |
| RNAD | Address - Address Of Motor-Device (NAD), + 0x40 (if Pos. Response), Neg.sepsonse (NAD)| |
| MCMD | Motor Command |
| RMCMD | Respond Motor-Command (simply Return MCMD) |
| 1) | Data Contents - To Be Used Flexible (according "MCMD" - Identifier). |
| 2) | Data Contents - To Be Used Flexible (according "RMCMD" - Identifier). |
| 3) | (0x11) - If Negative Response; (0x51) - If Positive Response! |
| 4) (SSEL) | Optionally Used As Sub-identifier (SSEL e.g. On MCMD: 0xB0, 0xB1, 0xB2); Otherwise It May Default To 0xFF. |
| Rtype | Reset-type - According LIN_Standard (ISO 14229). |
| SST | Slave-Status |
| 0xFF | Unused Data - Default (0xFF). |
| ▨ | Unused Data - Not Send (Tough - Data Length - Less Than 8 Bytes!) |

FIG. 13

| Ch-Sum | Data | Publisher | Subscriber | Description |
|---|---|---|---|---|
| T.B.C. | 6 | Master | Slave (NAD) | Write-Data/Cmd Frame |
| T.B.C. | 3 | Master | Slave (NAD) | Read Data Request |
| T.B.C. | 7 | Slave (NAD) | Master | Read Data (Response) |
| 0xC3 | 8 | Master | Slave (s) | Go-To-Sleep CMD (Broadcast) |
| T.B.C. | 8 | Master | Slave (NAD) | ECU-Reset |
| T.B.C. | 8 | Master | Slave (NAD) | ECU-Reset Response |

FIG. 13 (Continued)

| Request | Response |
|---|---|
| MCMD | RMCMD |
| 0x0A | 0x0A |

1700

| Short-ID | Description | Actions | Data Contents | Data-Limits | Explanation |
|---|---|---|---|---|---|
| Get_ActKey | Get Activate-Status Of Input-Key Function | Feedback Of; Trigger Internal Key-Command Function (e.g. To Be Used As Alternative To Hardware-key Inputs) | Key-ID "uint8" (1 Byte) | Min.: 0 (not Defined) 1: Key#1 2: Key#2 Max.: 2 | Info-states Of Direct And Momentary Control Of Motor-e.g. Key#1 Activates Motor CW, Key #2 Activates Motor CCW. In Addition; Send The <mopstates> & <mostopstates> Furthermore: Also 16-bit-value Of <act-position> In The Last Two Data Bytes |
| | | | Actual Op-status Of Motor Lsn@"uint8" (1 Byte) | Mopstates | |
| | | | Last Stop-status Of Motor Msn@"uint8" (1 Byte) | Mostopstates | |
| | | | "uint16" (act-position) | Min.: 1000 Max.: 2^16-1000 | |

FIG. 17

SMART MOTOR SYSTEMS AND METHODS USING LOCAL INTELLIGENCE

RELATED APPLICATIONS

This application claims the benefit of U.S. patent application Ser. No. 17/810,129, filed Jun. 30, 2022, and U.S. Provisional Patent Application No. 63/217,201, filed Jun. 30, 2021, the entire contents of each which are hereby incorporated by reference.

BACKGROUND

Modern vehicles and other machinery use motors to displace loads and/or additional system components based on received inputs. For example, motors may be used in an automobile to control the position, pitch, and/or supports of a seat. Additionally, some motors may be used in automobiles to open and close doors or trunks. Motors may also be used in automobiles to control the raising or lowering of windows, the pitch/angle placement of mirrors, or the control of locks.

FIG. 1 illustrates an example of a known motor system 100 implemented in a vehicle. The motor system 100 includes, for example, a controller 105 (for example, an electronic controller, a programmable microprocessor, a microcontroller, an electronic processor, or other suitable device), an input device 110, one or more switches 115, and a seat 120. The input device 110 may be, for example, a human-machine interface (HMI), such as a touch screen configured to receive touch inputs. In some instances, the input device 110 is integrated within the vehicle. The one or more switches 115 may be, for example, push-buttons, toggle switches, levers, or another type of input device associated with a predetermined command or function. The one or more switches 115 may be located on the seat 120, on a dashboard of the vehicle, implemented within doors of the vehicle, or the like.

The controller 105 receives control signals from the input device 110 and/or the one or more switches 115. The control signals are provided to the controller 105 via an electrical harness or similar connection. The controller 105 controls the motors within the vehicle motor system 100 based on the control signals. For example, the seat 120 may include a plurality of motors 125, such as a first motor 125A, a second motor 125B, a third motor 125C, a fourth motor 125D, and a fifth motor 125E. In the example shown, the first motor 125A causes movement of a head rest of the seat 120. The second motor 125B causes movement of an upper back portion of the seat 120. The third motor 125C causes movement of a middle back portion of the seat 120. The fourth motor 125D causes movement of a lower back portion of the seat 120. The fifth motor 125E causes of a sitting portion of the seat 120. Based on the control signals from the input device 110 and/or the one or more switches 115, the controller 105 controls each motor of the plurality of motors 125 to adjust the position of the seat 120. The controller 105 controls power and position signals to each of the plurality of motors 125 via independent connections. In this manner, each motor 125A-125E receives commands (or command signals) from the controller 105 that are intended only for the selected motor. For example, should the controller 105 receive a control signal from the input device 110 and/or the switches 115 to adjust the head rest of the seat 120, the controller 105 provides power and/or a command signal to only the first motor 125A. As should be apparent, in the motor system 100, the control intelligence for the motors 125 is centralized in the controller 105 and each motor 125 is pre-configured to perform a single function (for example, move a head rest).

SUMMARY

Individual control of each motor within the system limits the number of controllable motors to the size (e.g., number of input/output terminals) of the system controller. Accordingly, multiple controllers may be needed to control a given number of motors. Additionally, data packets transmitted to the motors are large, requiring multiple frames for each motor. Examples described herein provide for a dynamic configuration of smart motors without the need for a centralized controller. The smart motors communicate over a control bus, such as a LIN bus. Data packets transmitted over the LIN bus include a plurality of frames detailing an operation to be performed and an intended recipient.

One example provides a smart motor that includes a motor, a memory, and an electronic processor connected to the motor and the memory. The electronic processor executes a software stack including a hardware layer, an operating layer, and an application layer. The hardware layer provides input/output operations between the motor and the electronic processor. The operating layer provides an intermediary between the hardware layer and the application layer. The application layer executes functions stored in the memory to communicate with and control the hardware layer. Further, the hardware layer, the operating layer, and the application layer selectively control operation of the motor based on one or more signals received from an input device.

The memory includes one or more software instructions that are executable by the electronic processor to receive a command indicating an action to be performed and determine whether to act on a received command.

The hardware layer further includes input/output operations for a motor driver.

The hardware layer further includes input/output operations between the electronic processor and a power conditioning circuit connected to the motor.

The hardware layer further includes input/output operations between the electronic processor and at least one sensor connected to the electronic processor.

The hardware layer further includes input/output operations between the electronic processor and at least one switch connected to the electronic processor.

The hardware layer further includes input/output operations between the electronic processor and the memory.

Another example provides a smart motor that includes a motor, a memory, and an electronic processor connected to the motor and the memory. The electronic processor executes a software stack including a hardware layer, an operating layer, and an application layer. The hardware layer provides a plurality of input/output operations between the motor and the electronic processor. The operating layer provides an intermediary between the hardware layer and the application layer. The application layer executes functions stored in the memory to communicate with and control the hardware layer. The memory includes one or more software instructions that are executable by the electronic processor to receive a command indicating an action to be performed and determine whether to act on a received command.

The operating layer alters data received by the hardware layer for analysis by the application layer.

The operating layer includes an application programming interface input/output (API I/O) that acts as an intermediary between one or more physical components of the hardware layer and software within the application layer.

The API I/O includes a motor interface, a supply control interface, a sensor interface, a switch interface, a communication interface, or any combination thereof.

The operating layer includes an application programming interface non-volatile memory (API NVM) interface that acts as an intermediary between the memory and software of the application layer.

The API NVM interface includes an electrically erasable programmable read-only memory (EEPROM) API.

The API NVM interface further includes one or more NVM functions.

The API NVM interface further includes one or more EEPROM configuration operations.

Still another example provides a smart motor that includes a motor, a memory, and an electronic processor connected to the motor and the memory. The electronic processor executes a software stack including a hardware layer, an operating layer, and an application layer. The hardware layer provides a plurality of input/output operations between the motor and the electronic processor. The operating layer provides an intermediary between the hardware layer and the application layer. The application layer executes functions stored in the memory to communicate with and control the hardware layer. The memory includes one or more software instructions that are executable by the electronic processor to receive a command indicating an action to be performed, selectively performing the action, receive a request for a status of the smart motor, and transmit the status of the motor.

The application layer further includes an application control module, an error handler module, a drive control module, an input/output control module, a communication control module, a system monitor module, a scheduler module, or a combination thereof.

The drive control module functions as a motor driver.

The application control module includes one or more primary applications, sub-applications, and application macros used to control the smart motor.

The application control module is configured to receive commands from a switch, analyze the command, and provide an output command the drive control module.

Other features, aspects, embodiments, and benefits will become apparent by consideration of the detailed description and accompanying drawings.

BRIEF DESCRIPTION OF THE DRAWINGS

FIG. 13 is a chart of a plurality of data frames communicated over the smart motor system of FIG. 2, according to some examples.

FIG. 17 is a chart of an example read data command frame.

DETAILED DESCRIPTION

One or more aspects, features, and embodiments are described and illustrated in the following description and accompanying drawings. These aspects, features, and embodiments are not limited to the specific details provided herein and may be modified in various ways. Furthermore, other aspects, features, and embodiments may exist that are not described herein. For example, a device or structure that is "configured" in a certain way is configured in at least that way but may also be configured in ways that are not listed. Furthermore, some instances described herein may include one or more electronic processors configured to perform the described functionality by executing instructions stored in non-transitory, computer-readable medium. Similarly, examples described herein may be implemented as non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms, for example, first and second, top and bottom, and the like may be used herein solely to distinguish one entity or action from another entity or action without necessarily requiring or implying any actual such relationship or order between such entities or actions.

In some instances, method steps are conducted in an order that is different from the order described.

Figure 2:
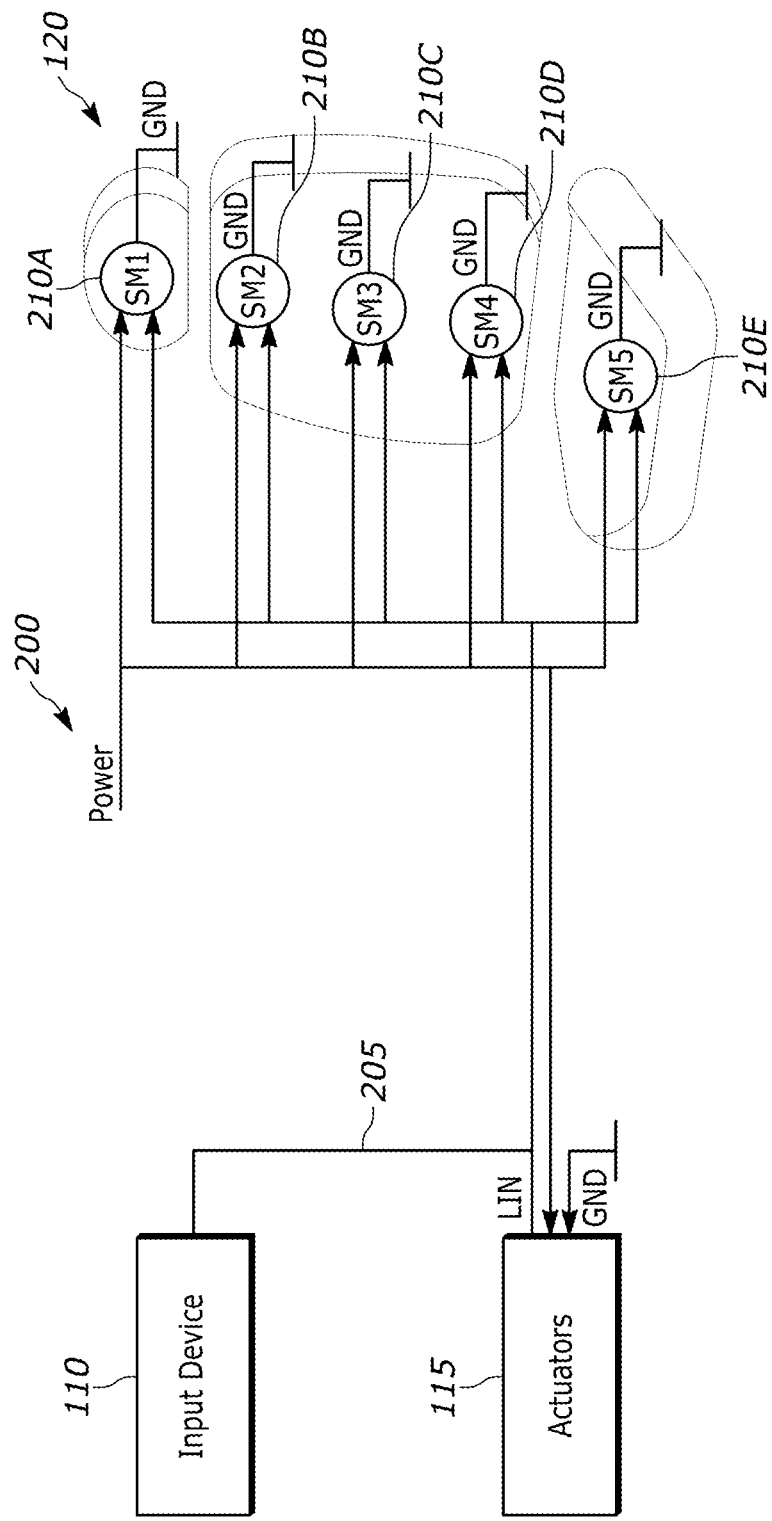
FIG. 2 is a schematic diagram of a smart motor system, according to some examples.

As noted above, some vehicles such as automobiles may use motors to adjust or move the position of a seat. FIG. 2 illustrates a smart motor system 200 according to some examples. The smart motor system 200 includes an input device 110, one or more switches 115, and a seat 120. The seat 120 includes a plurality of smart motors 210, such as a first smart motor 210A, a second smart motor 210B, a third smart motor 210C, a fourth smart motor 210D, and a fifth smart motor 210E. The first smart motor 210A controls and causes movement of a head rest of the seat 120. The second smart motor 210B controls and causes movement of an upper portion of the seat 120. The third smart motor 210C controls and causes movement of a middle portion of the seat 120. The fourth smart motor 210D controls and causes movement of a lower portion of the seat 120. The fifth smart motor 210E controls and causes movement of a sitting portion of the seat 120. The input device 110, the one or more switches 115, and each of the plurality of smart motors 210 are communicatively connected via a control bus 205. The control bus 205 may be, for example, a CAN bus, a LIN bus, or another suitable communication bus. In some instances, the control bus 205 is implemented using a wireless connection.

Inputs (for example, commands, signals, etc.) received by the input device 110 and the one or more switches 115 are provided to the plurality of motors 210 via the control bus 205. In this manner, every command from the input device 110 and the one or more switches 115 are received by every smart motor 210 in the smart motor system 200. Each smart motor 210 includes an electronic processor configured to determine whether to act on the received command, as described in more detail below.

Figure 3:
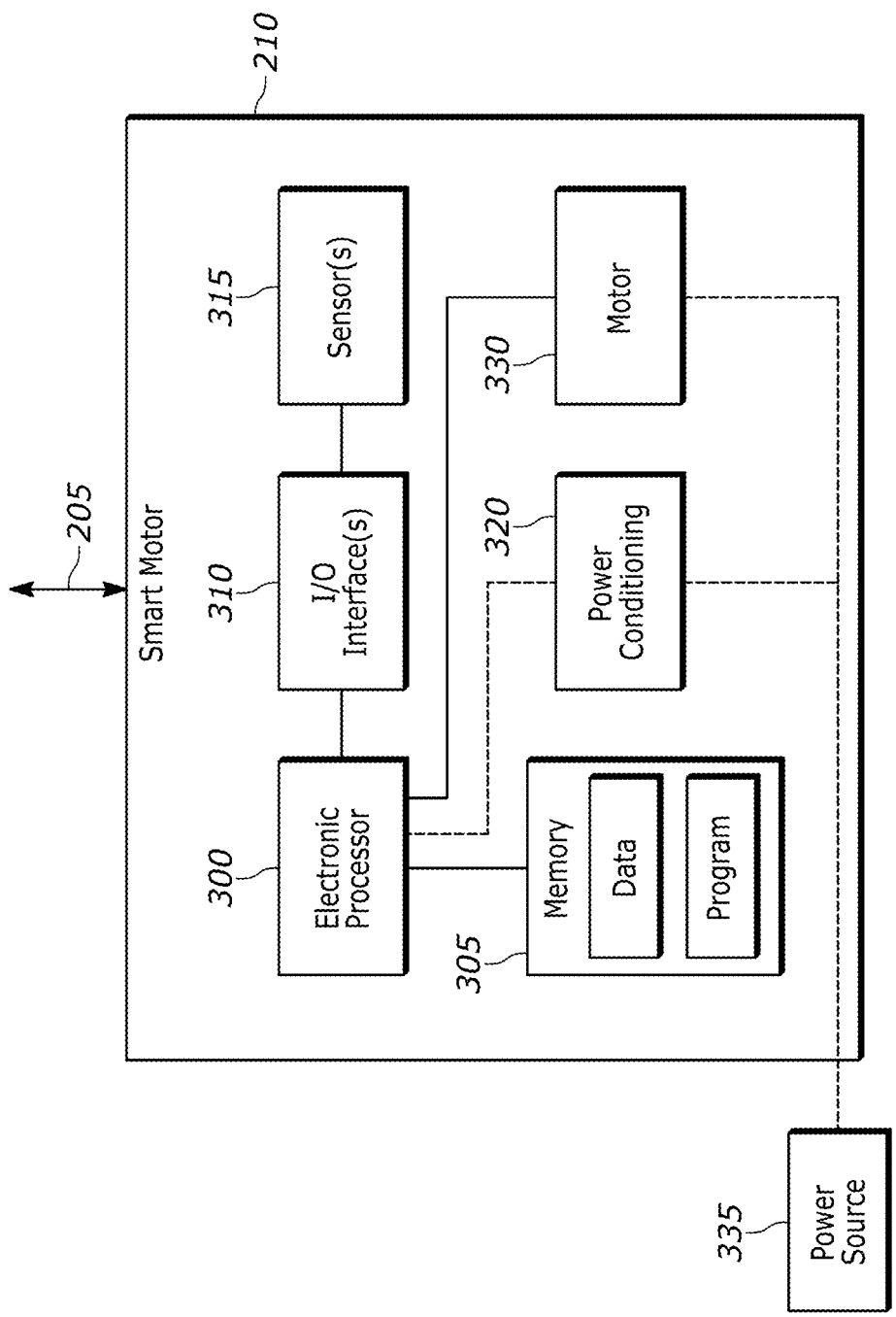
FIG. 3 is a block diagram of a smart motor of FIG. 2, according to some examples.

FIG. 3 illustrates an exemplary smart motor 210. The smart motor 210 includes an electronic processor 300 (for example, an electronic controller, a programmable microprocessor, a microcontroller, or other suitable device), a memory 305, an input/output (I/O) interface 310, one or more sensors 315, a power conditioning circuit 320, and a motor 330. The components of the smart motor 210, such as the motor 330 and the electronic processor 300 (using the power conditioning unit 320) receive power from a power source 335. The smart motor 210 communicates with other components of the smart motor system 200, such as the input device 110 and the one or more switches 115, via the control bus 205.

The memory 305 is a non-transitory computer readable medium that includes, for example, a program storage area and a data storage area. The program storage area and the data storage area can include combinations of different types of memory, such as read-only memory ("ROM"), random access memory ("RAM") (for example, dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 300 is connected to the memory 305 and executes software instructions that are capable of being stored in a RAM of the memory 305 (for example, during execution), a ROM of the memory 305 (for example, on a generally permanent basis), or another non-transitory computer readable medium such as another memory or a disc. Software included in the implementation of the smart motor 210 can be stored in the memory 305. The software includes, for example, firmware, one or more applications, program data, filters, rules, one or more program modules, and other executable instructions. The electronic processor 300 is configured to retrieve from the memory 305 and execute, among other things, instructions related to the control processes and methods described herein. In other constructions, the smart motor 210 includes additional, fewer, or different components.

The I/O interface 310 is connected to the electronic processor 300 and may be configured to provide the electronic processor 300 with control signals or commands received via the control bus 205. The I/O interface 310 may include a digital I/O interface, an analog I/O interface, a communication interface, and/or other suitable interfaces. In some examples, the I/O interface 310 is connected to the one or more sensors 315 such that the I/O interface 310 acts as a bridge between the one or more sensors 315 and the electronic processor 300. In other examples, the one or more sensors 315 may be connected directly to the electronic processor 300.

In some instances, the smart motor 210 is capable of wireless communication. In such an example, the I/O interface 310 includes a transceiver wireless communication interface capable of communicating on, for example, a cellular network, a Long Term Evolution (LTE) network, a 5G network, a Bluetooth™ network, a wireless local area network (for example, Wi-Fi), a wireless accessory Personal Area Network (PAN), or the like. Additionally, the control bus 205 itself may be a wireless communication medium such that data is sent wirelessly from the input device 110 and the one or more switches 115 to the plurality of smart motors 210.

The one or more sensors 315 may include, for example, temperature sensors, Hall effect sensors, battery sensors (for example, battery voltage and battery current sensors), positional sensors, back-emf sensors, motor current sensors, and/or other auxiliary sensors. Temperature sensors may provide temperature signals indicative of a temperature within the smart motor 210, a temperature of the motor 330, or the like. Hall effect sensors may provide position information related to the smart motor 210. For example, the Hall effect sensors may monitor a permanent magnet system implemented within the motor 330. A permanent magnet may be coupled to a rotor shaft of the motor 330. The Hall effect sensors detect movement of the permanent magnet. The controller 300 receives the position information and counts motor revolutions, identifies a position of the rotor, and the like. Battery sensors may provide battery signals indicative of a supply-voltage from the power source 335. Positional sensors may provide position signals indicative of the current position of the seat 120, a position of the motor 330, or the like. Back-emf sensors may provide a voltage signal indicative of a speed of the motor 330. Motor current sensors may provide current signals indicative of a current flowing through the motor 330. However, additional sensors may be implemented to sense various characteristics of the smart motor 210 and the seat 120. While the one or more sensors 315 are illustrated as being within the smart motor 210, the electronic processor 300 may receive sensor data from additional sensors separate from the smart motor 210. Such sensor data may be provided via, for example, the control bus 205.

The power conditioning circuit 320 may be or include, for example, a transformer, a rectifier, a filter, a DC-to-DC converter or other power conditioning components to alter the power received from the power source 335 so that the power is suitable for use by the electronic processor 300. The smart motor 210 may include other power conditioning circuits, for example, a circuit to condition the power provided to the motor 330. The motor 330 may be, for example, an AC motor, a DC motor, a servomotor, a stepper motor, or the like. In some examples, the smart motor 210 is different from the examples described and illustrated. In one example, a smart actuator is used in place of a smart motor. A smart actuator may include, in addition to or in place of the motor 330, additional types of actuators. For example, the smart actuator may include electro-magnetic actuators (for example, solenoids). In other examples, a comfort feature component is implemented. For example, in some instances, resistive loads (for example, heating elements) are used in place of or in addition to the motor 330 to provide seat heating to improve passenger comfort. Other components may be used in place of or in addition to the motor 330 to implement desired features.

Figure 4:
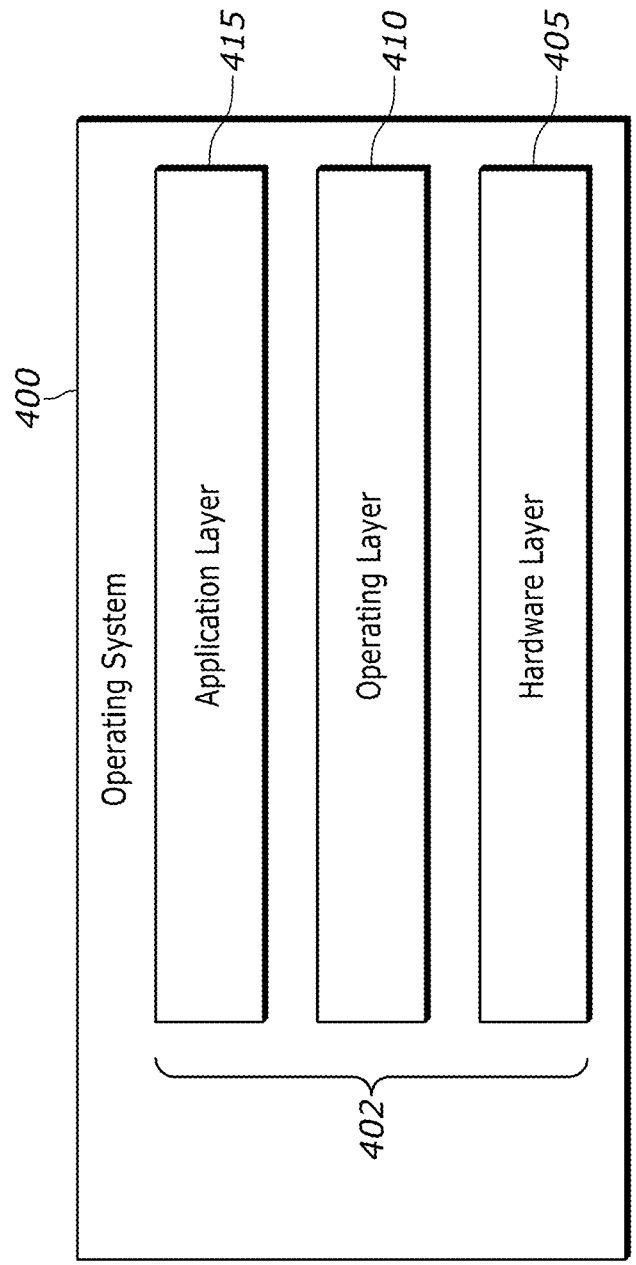
FIG. 4 is a block diagram of the architecture of a smart motor of FIG. 2, according to some examples.

Software controlling the operation of the smart motor 210 is organized or architected in a stack 402 that includes several layers. FIG. 4 illustrates an operating system 400 upon which a software stack for the smart motor 210 is implemented. The operating system 400 is stored in memory (for example, memory 305) and may be executed or run by the electronic processor 300. The stack 402 includes a hardware layer 405, an operating layer 410, and an application layer 415. The hardware layer 405 serves as an input and output layer of the electronic processor 300 and other components of the smart motor 210. For example, the hardware layer 405 receives signals from the I/O interface 310 and/or the one or more sensors 315. Additionally, the hardware layer 405 provides control signals to drive the motor 330. The operating layer 410 acts as an intermediary between the hardware layer 405 and the application layer 415. The application layer 415 executes functions stored in the memory 305 to communicate with and control components of the hardware layer 405.

Figure 5:
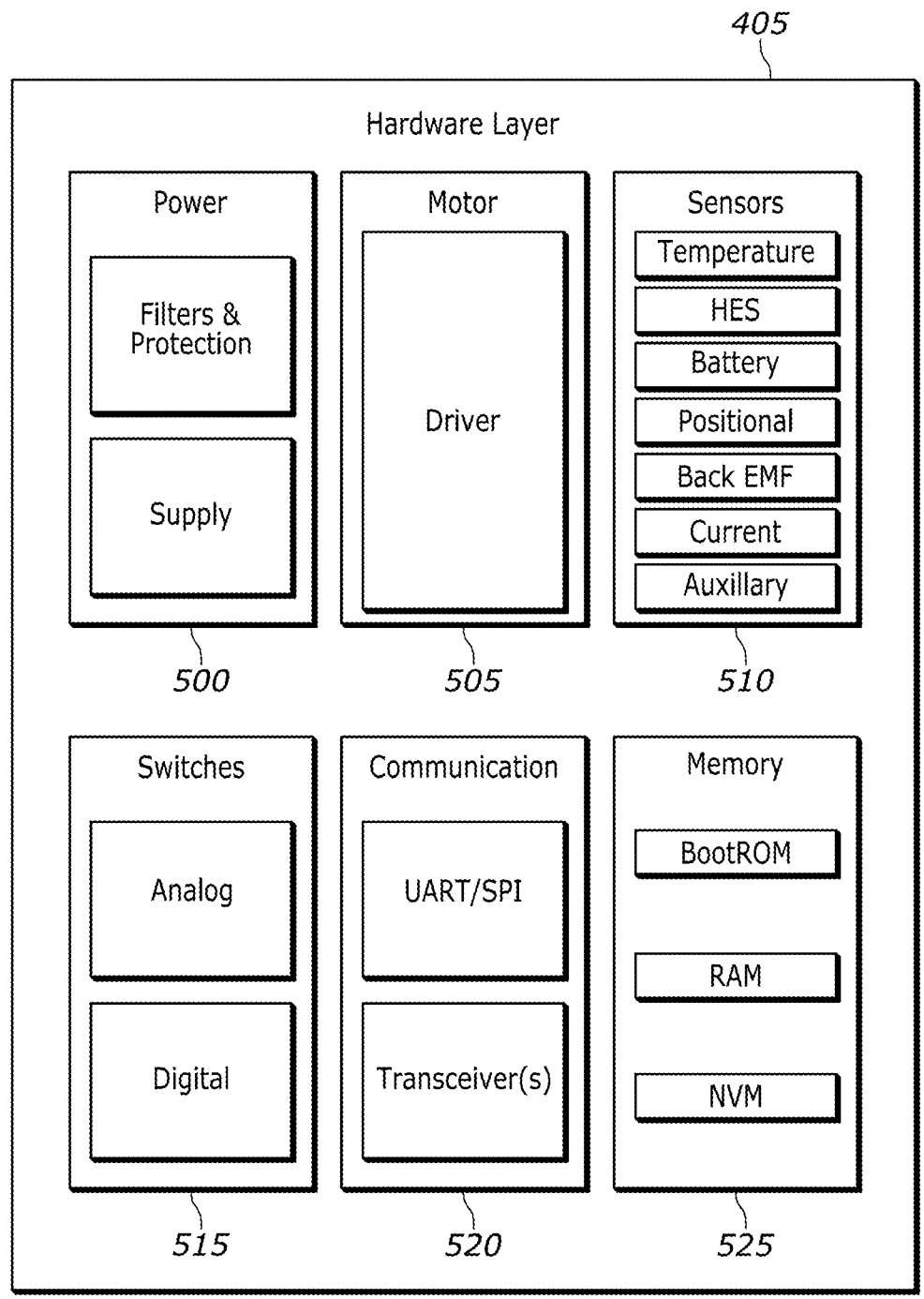
FIG. 5 is a block diagram of the hardware layer of FIG. 4, according to some examples.

FIG. 5 illustrates a block diagram of the hardware layer 405 according to some examples. The hardware layer 405 includes a plurality of blocks indicative of a function, operation, or the like. For example, the exemplary hardware layer 405 illustrated in FIG. 5 includes a power block 500, a motor block 505, a sensor block 510, a switch block 515, a communication block 520, and a memory block 525. However, in some examples, the hardware layer 405 may include more or fewer blocks based on the components of the system. Each block represents an input/output operation with respect to the corresponding component of the smart motor 210. For example, the power block 500 represents an input/output operation between the electronic processor 300 and the power conditioning circuit 320. The power block 500 may include, among other things, operations related to filtering applied to the power received from the power supply 335, operations related to the power supply 335 itself, and the like.

The motor block 505 represents an input/output operation between the electronic processor 300 and the motor 330. The motor block 505 may include operations related to control of the motor 330. The motor block 505 represents input and/or output operations for a motor driver. The sensor block 510 represents an input/output operation between the electronic processor 300 and the one or more sensors 315. For example, the sensor block 510 may include operations related to interpreting signals received from each of the one or more sensors 315. The switches block 515 represents an input/output operation between the electronic processor 300 and the one or more switches 115. The communication block 520 represents an input/output operation between the electronic processor 300 and the I/O interface 310. The memory block 525 represents an input/output operation between the electronic processor 300 and the memory 305, such as for assisting with memory allocation.

Figure 6:
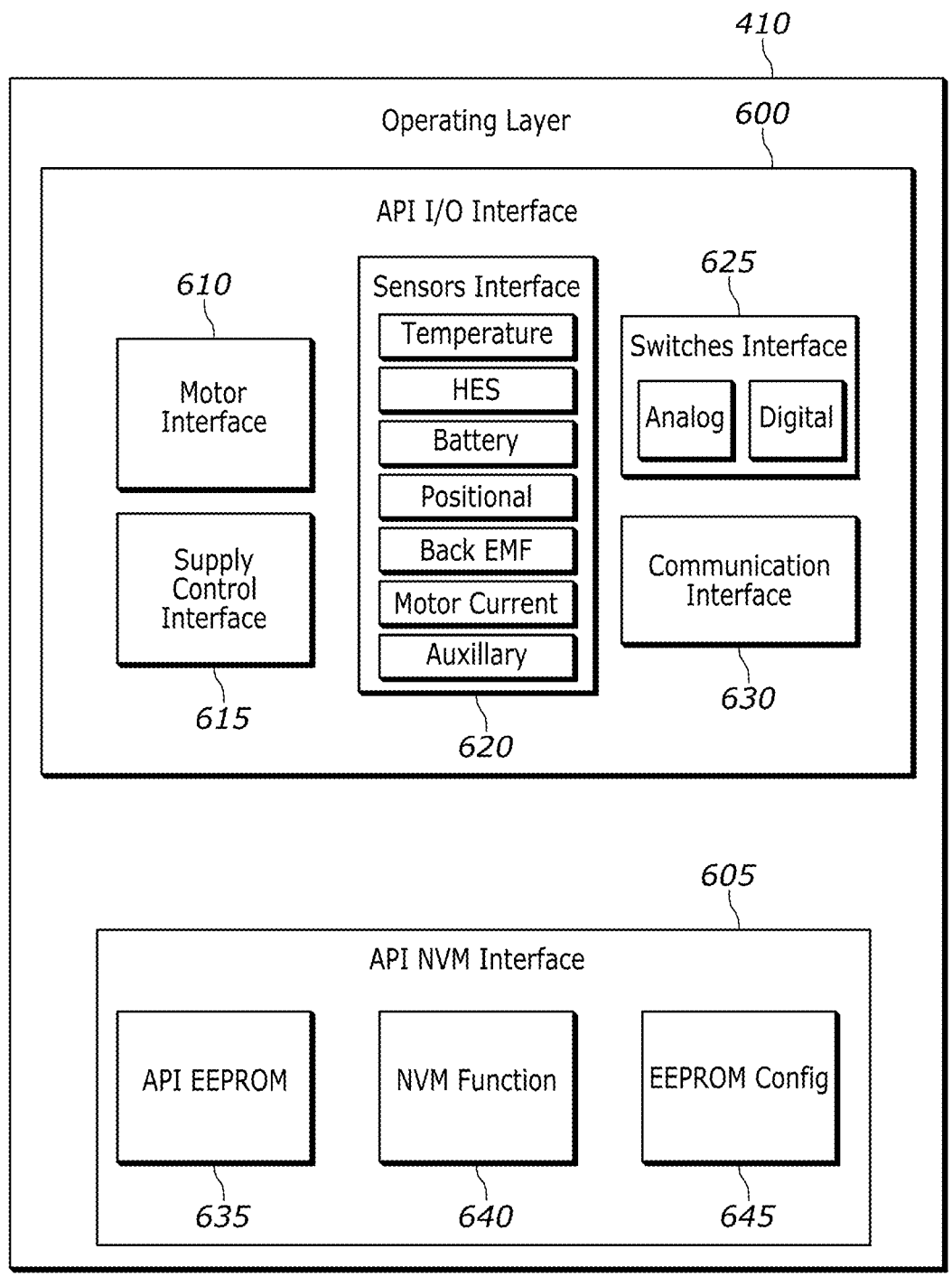
FIG. 6 is a block diagram of the operating layer of FIG. 4, according to some examples.
Figure 7:
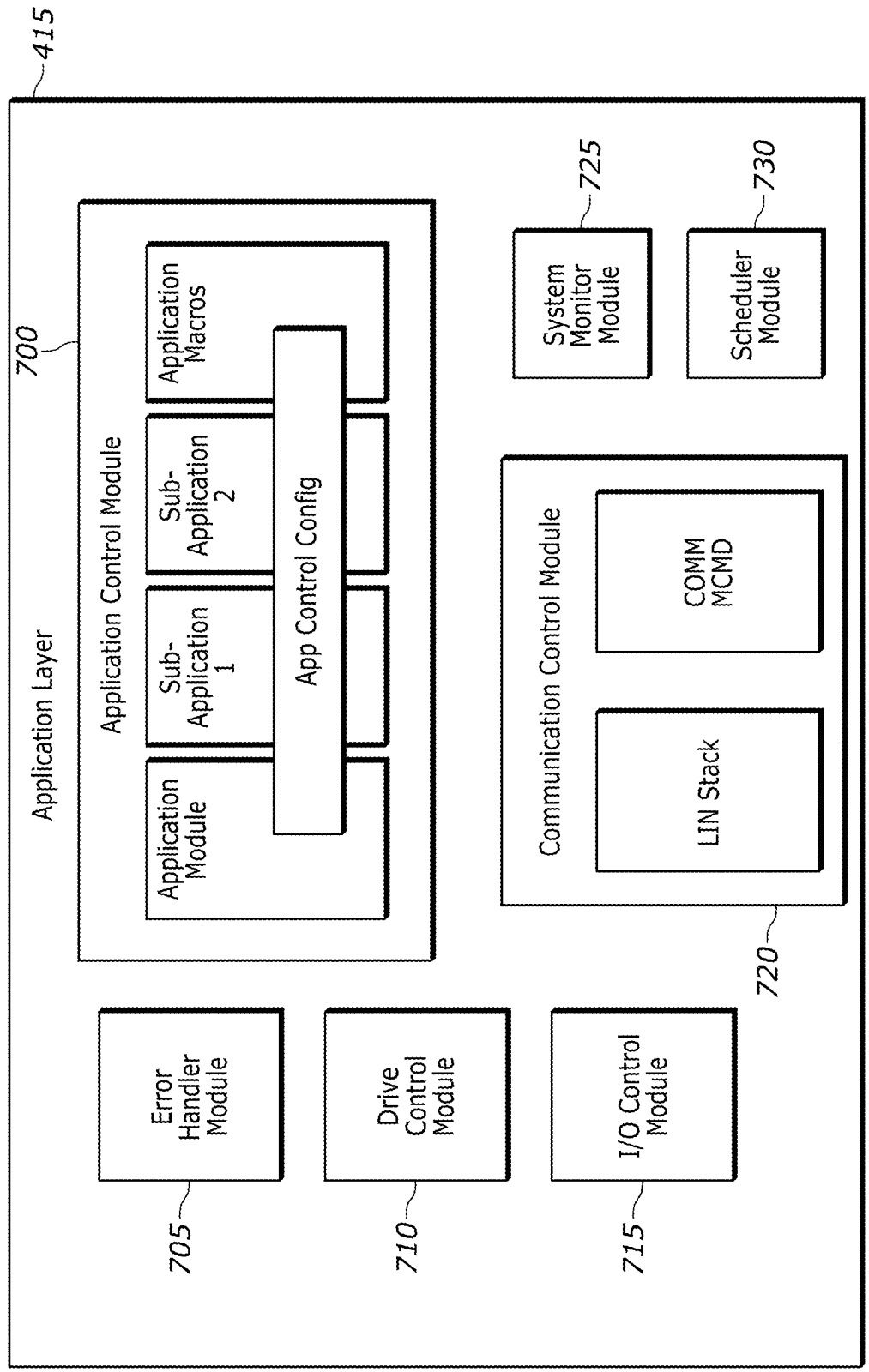
FIG. 7 is a block diagram of the application layer of FIG. 4, according to some examples.

The operating layer 410 acts as an intermediary between the hardware layer 405 and the application layer 415. The operating layer may alter data received by the hardware layer 405 for analysis by the application layer 415. As illustrated in FIG. 6, the operating layer 410 may include, among other things, an application programming interface (API) I/O interface block 600 and an API non-volatile memory (NVM) interface 605. The API I/O interface block 600 acts as an intermediary between the physical components of the hardware layer 405 (such as the power block 500, the motor block 505, the sensor block 510, the switch block 515, and the communication block 520) and the software and macros of the application layer 415 (described in more detail below). The API I/O interface block 600 may include, among other things, a motor interface 610, a supply control interface 615, a sensor interface 620, a switch interface 625, and a communication interface 630. However, the API I/O interface block 600 may include additional interfaces as needed to interact with the hardware layer 405.

The API NVM interface 605 acts as an intermediary between the memory 305 (through the memory block 525) and the software and macros of the application layer 415. The API NVM interface 605 includes, among other things, an EEPROM API 635, NVM functions 640, and an EEPROM config operation(s) 645. However, the API NVM interface 605 may include more or fewer blocks as needed to manage memory allocation of the memory 305.

The application layer 415 includes functions, operations, software, macros, and the like related to operation of the smart motor 210. The application layer 415 includes, among other things, an application control module 700, an error handler module 705, a drive control module 710, an I/O control module 715, a communication control module 720, a system monitor module 725, and a scheduler module 730. The application control module 700 may include a variety of applications used to control the smart motor 210, such as a primary application, a combination of sub-applications, and a plurality of application macros. Each application may work in conjunction with each other through an app control config program.

The drive control module 710 includes functions, operations, software, and the like related to operation of the motor 330. In some examples, the drive control module 710 functions as a motor driver. In one instance, with respect to the first smart motor 210A, the switch block 515 of the hardware layer 405 receives commands from one of switches 115 to activate the motor 330 until the head rest is in a first position. The application control module 700 receives the commands from the switch block 515 (through the switch interface 625). Additionally, a position sensor of the one or more sensors 315 provides position information to the sensor block 510. The application control module 700 receives the position information from the sensor block 510 (through the sensor interface 620). The application control module 700 analyzes the command from the switch block 515 and the position information from the sensor block 510 to determine how long to activate the motor 330 of the smart motor 210A to move the head rest from its current position to the first position. The application control module 700 then provides an output command and/or additional operating parameters to the drive control module 710. The drive control module 710 provides the output command to the motor interface 610. The motor interface 610 provides the output command to the motor block 505, which controls the motor driver 325 accordingly.

The communication control module 720 receives and processes information received from the communication interface 630. In some examples, the communication control module 720 includes the necessary communication protocols for communicating with components of the smart motor 210 and the smart motor system 200. For example, the communication control module 720 may include a LIN stack for communicating over the control bus 205. The I/O control module 715 receives and processes information received from the sensor interface 620. The I/O control module 715 may include operations and programs related to sensor data received from the sensor interface 620, such as how sensor data is analyzed.

The system monitor module 725 monitors the states and operation of the application control module 700, the error handler module 705, the drive control module 710, the I/O control module 715, the communication control module 720, and the scheduler module 730. Additionally, the system monitor module 725 monitors each of the corresponding lower level interfaces (for example, the API I/O interface 600 and API NVM interface 605). The system monitor module 725 may control system boot-release operations and system runtime states (for example, sleep-modes, fault-shutdown events, and the like).

The scheduler module 730 is responsible for managing the timing of the other modules within the application layer 415 and for distributing computation power to the other modules within the application layer 415. In some instances, the scheduler module 730 is used by the operating system 400 to operate as a real-time operating system (RTOS).

The error handler module 705 receives and/or stores data from the operating layer 410 and the other modules of the application layer 715 that relate to encountered errors or warning codes. The errors and warning codes are provided to the system monitor module 725 to determine whether to address (or act on) any errors or abnormalities occurring within the smart motor 210. The system monitor module 725 may then instruct an additional module within the application layer 415 to alter operation of the smart motor 210 to handle the error. For example, the sensor block 510 of the hardware layer 405 may receive a temperature signal from a temperature sensor included in the one or more sensors 315. The temperature signal is provided to the sensor interface 620 in the operation layer 405. The sensor interface 620 may analyze or adjust the temperature signal in some way before providing an adjusted temperature signal to the application layer 415. In some instances, the temperature signal is provided to the application layer 415 with no adjustments. The error handler module 705 receives the adjusted temperature signal and provides the adjusted temperature signal to the system monitor module 725. The system monitor module 725 determines an overtemperature condition is occurring within the smart motor 210. The system monitor module 725 may provide a control command to the drive control module 710 to stop operation of the smart motor 210 (for example, the motor 330).

The provided blocks, interfaces, and modules used described the operating system of the smart motor 210 are merely examples and are not intended to be limiting. The operating system of the smart motor 210 may include more or of less blocks based on components within the smart motor system 200. Additionally, while illustrated as separate, the various blocks, interfaces, and modules may be combined or separated to further illustrate different functions of the operating system. Further components (for example, auxiliary components) beyond operation of the motor 330 may be implemented within the operating system of the smart motor 210. For example, a heater may be implemented within the seat 120. A command from the input device 110 and/or the one or more switches 115 may instruct one of the plurality of smart motors 210 to turn the heater on. Accordingly, the hardware layer 405, the operating layer 410, and the application layer 415 includes the required blocks, interfaces, and modules to receive commands related to the heater, interpret the commands, and provide outputs to control the heater.

Figure 8:
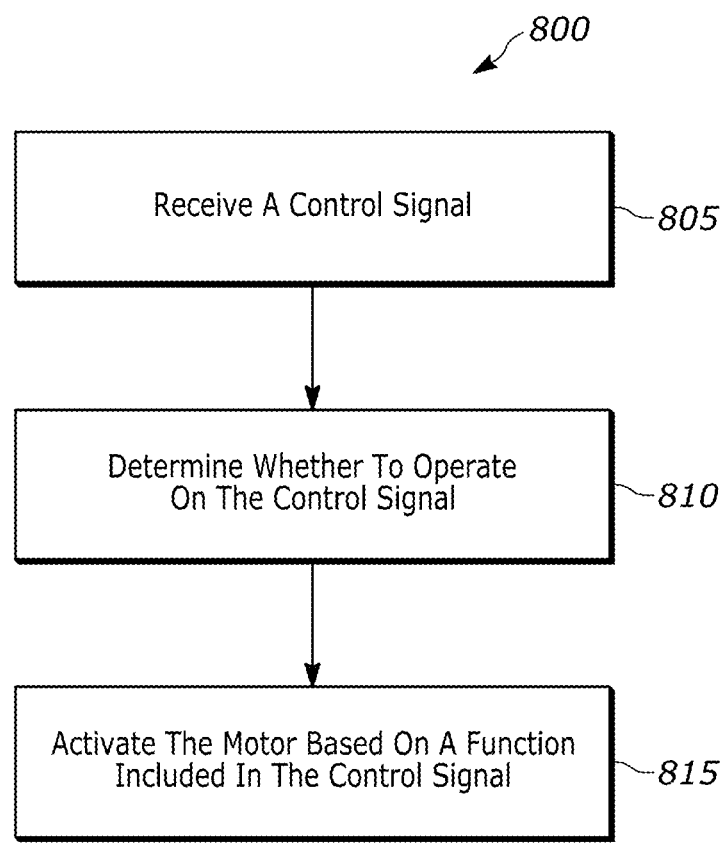
FIG. 8 is a block diagram of a method performed by the electronic processor of FIG. 3, according to some examples.

Signals and commands sent on the control bus 205 are received by each of the plurality of smart motors 210. FIG. 8 provides a method 800 performed by the electronic processor 300 within each of the plurality of smart motors 210. At step 805, the electronic processor 300 receives a control signal. For example, the input device 110 and/or the one or more switches 115 provide a control signal to the control bus 205. Each of the plurality of smart motors 210 receive the control signal on the control bus 205. In some instances, when the smart motor system 200 is a wireless system, the input device 110 and/or the one or more switches 115 broadcast the control signal.

At step 810, the electronic processor 300 determines whether to react to or operate on the received control signal. For example, the control signal includes or embody a command indicative of "move the lower back portion of the seat 120 to the third position." The fourth smart motor 210D is associated with the lower back portion of the seat 120. Accordingly, at step 815, the electronic processor 300 of the fourth smart motor 210D determines to activate the motor 330 to perform the function included in the received control signal. However, the first smart motor 210A, the second smart motor 210B, the third smart motor 210C, and the fifth smart motor 210E also receive the control signal indicative of "move the lower back of the seat 120 to the third position." Since these motors are not associated with the lower back portion of the seat 120, their respective electronic processors 300 disregard the control signal.

In certain aspects, communication over the control bus 205 occurs using a series of communication frames (e.g., data packets, data frames). In one example, the input device 110 and/or the one or more switches 115 broadcast data frames over the control bus 205 based on received user inputs. Each of the smart motors 210 receive the data frames and determine whether to perform the action indicated by the data frame. The input device 110, the one or more switches 115, and the smart motors 210 communicate on the control bus 205 by transmitting write data (<WR_Data>) frames (e.g., a command frame, a control frame), read data request (<RD_Data_Req>) frames (e.g., a data request frame), and read data (<RD_Data>) frames (e.g., response frames). The write data frames, the read data request frames, and the read data frames are transmitted as subsequent frames as a set of communication frames. To command a smart motor 210, the input device 110 and/or the one or more switches 115 transmit the write data frames. To read data from any smart motor 210, the input device 110 and/or the one or more switches 115 transmit read data request frames. The smart motor 210 responds to a read data request frame with a read data frame.

Once this set (or cycle) of data frames is transmitted once, subsequent data read functions may be performed using only the read data frame. For example, should the input device 110 and/or the one or more switches 115 monitor operation of the respective smart motor 210 as it performs a previously-commanded function, the input device 110 and/or the one or more switches 115 transmit read data request frames and receive read data frames without transmitting a write data frame. This operation may occur at a set predetermined frequency stored in the memory of the input device 110 and the one or more switches 115.

Figure 9:
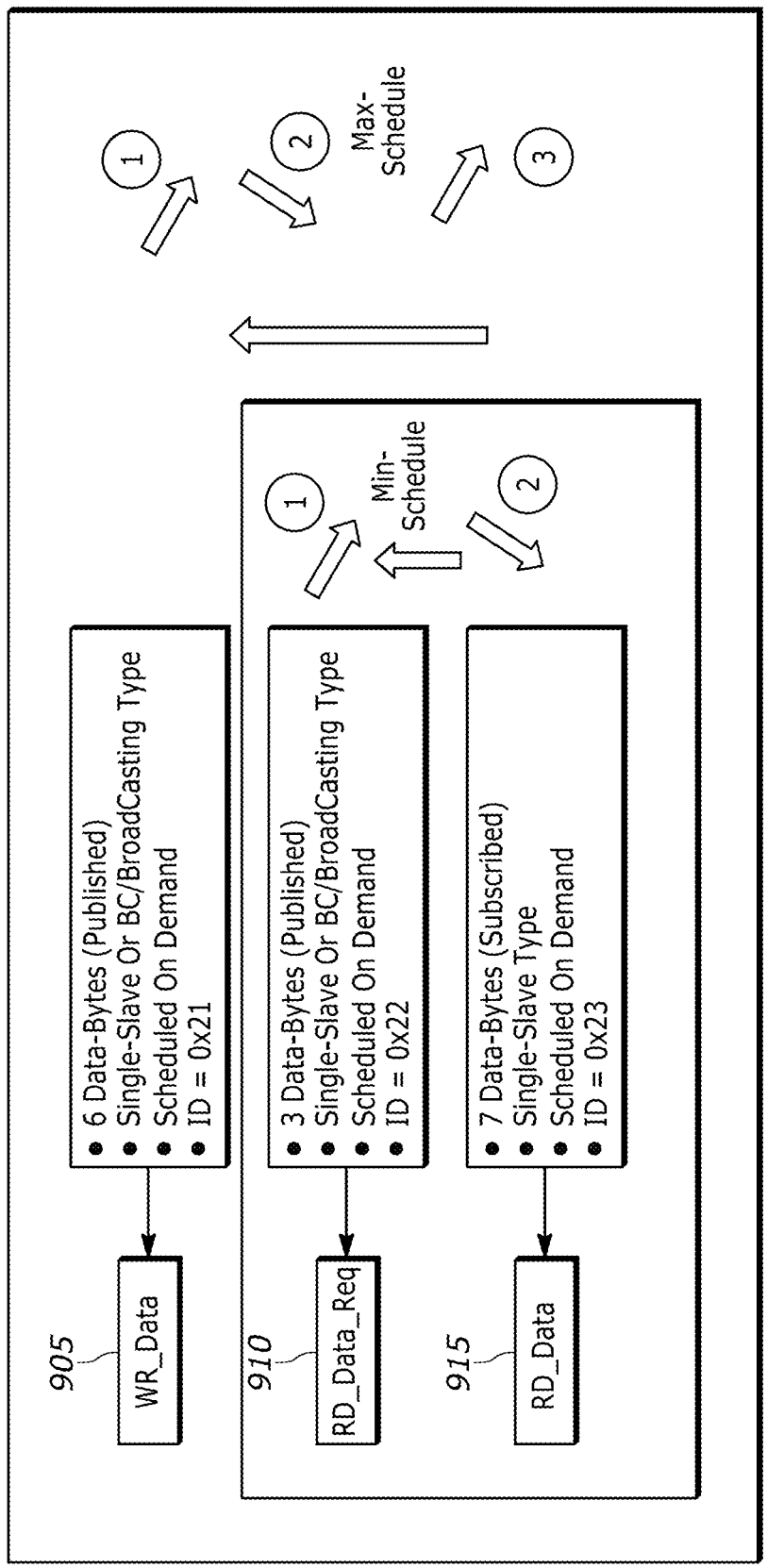
FIG. 9 is a diagram illustrating a plurality of data frames communicated over the smart motor system of FIG. 2, according to some examples.

FIG. 9 illustrates examples of a write data frame 905, a read data request frame 910, and a read data frame 915. Write frames 905 are commands indicate an action to be performed by at least one of the smart motors 210. As shown in FIG. 9, the write frame 905 includes six bytes of data indicating the action (or command) for the smart motor 210. Write frames 905 may be transmitted for performance by a single smart motor 210 or a plurality of smart motors 210, as indicated by a node-address included in the write frame 905.

Figure 10:
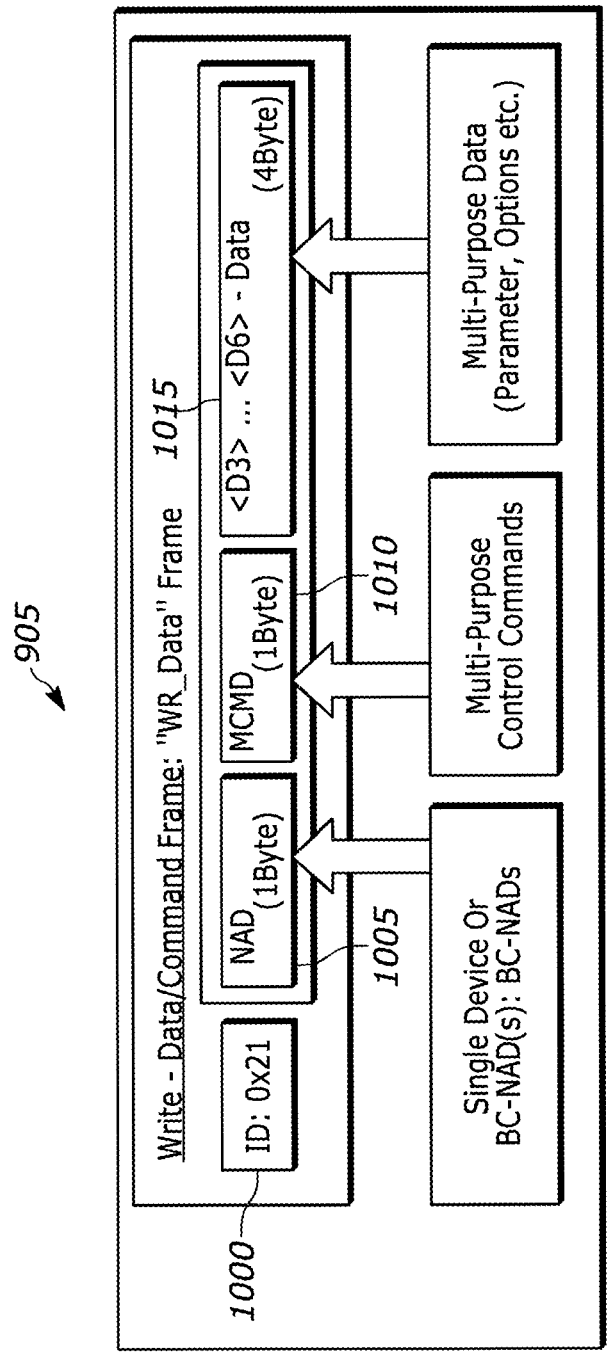
FIG. 10 is a diagram of a write data command frame, according to some examples.

FIG. 10 illustrates a write data frame 905 according to one example. The write data frame 905 includes an identification block 1000, an address block 1005, a command block 1010, and a data block 1015. The identification block 1000 includes an identification code corresponding to a type of the frame being provided. For example, the identification code 0x21 shown in FIG. 10 indicates that the frame is a write data frame. The address block 1005 includes an address (e.g., a node-address) indicating which smart motor 210 should perform the action. The address block 1005 may indicate a single smart motor 210, a group or subset of smart motors 210, or every smart motor 210 connected to the control bus 205. In some instances, the address block 1005 includes one byte of data. In some instances, the value of the address block 1005 ranges from 0x01 to 0x3F.

The command block 1010 includes data indicating the command to be performed by the smart motor 210. In some instances, the command block 1010 includes one byte of data. Possible values of the command block 1010 may range from 0x00 to 0xAF and 0xB8 to 0xFF. The data block 1015 includes data indicating parameters and options used to perform the command. While the example data block 1015 illustrated in FIG. 10 includes four bytes of data, the data block 1015 may include more or fewer bytes of data.

Figure 11:
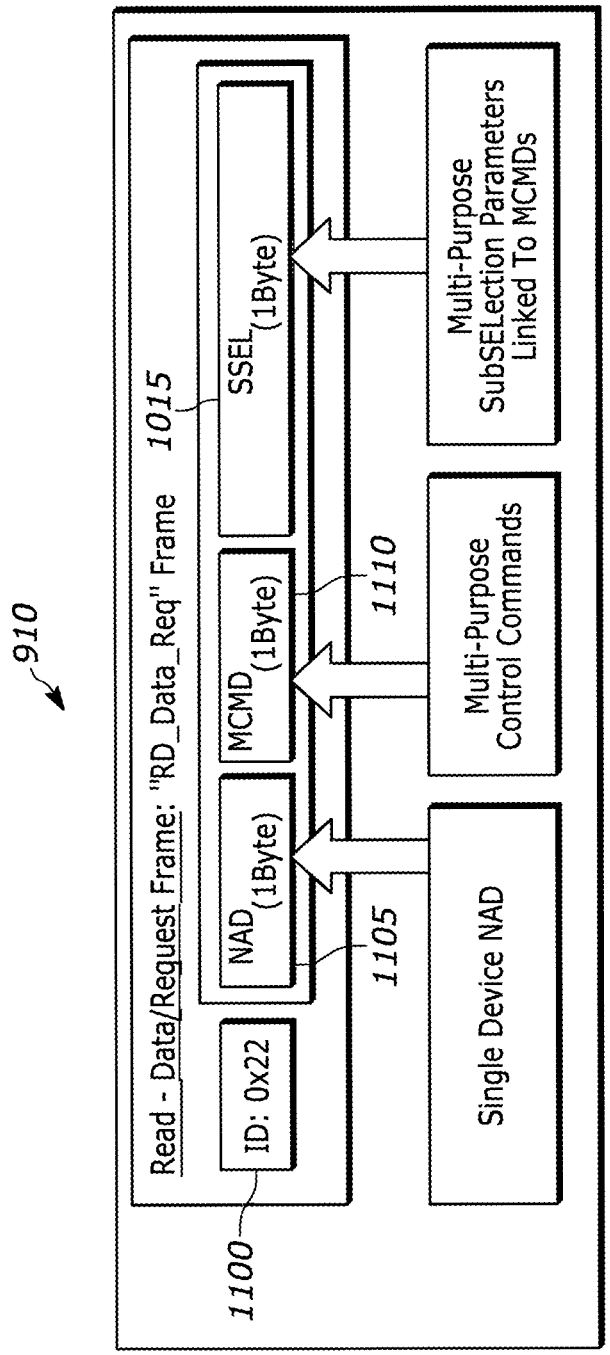
FIG. 11 is a diagram of a read data request command frame, according to some examples.

Returning to FIG. 9, the example read data request frame 910 includes three bytes of data indicating the action (or command) for the smart motor 210. Read data request frames 910 may be transmitted for receipt by a single smart motor 210 or a plurality of smart motors 210, as indicated by a node-address included in the read data request frame 910. FIG. 11 provides a detailed read data request frame 910 according to one example. The read data request frame 910 includes an identification block 1100, an address block 1105, a command block 1115, and a sub-selection block 1120. The identification block 1100 includes an identification code corresponding to a type of the frame being provided. For example, the identification code 0x22 shown in FIG. 11 indicates that the frame is a read data request frame. The address block 1105 includes an address indicating which smart motor 210 should perform the action. In some instances, the address block 1105 includes one byte of data. In some instances, the value of the address block 1105 ranges from 0x01 to 0x3F.

The command block 1110 includes data indicating the command to be performed by the smart motor 210. In some instances, the command block 1110 includes one byte of data. Possible values of the command block 1110 may range from 0x00 to 0xAF and 0xB8 to 0xFF. The sub-selection block 1120 provides a sub-index for chained data selections. In some instances, the read data request frame also includes data bytes D4-D8. The read data request frame 910 prepares the input device 110 and/or the one or more switches 115 for a subsequent data read command.

Figure 12:
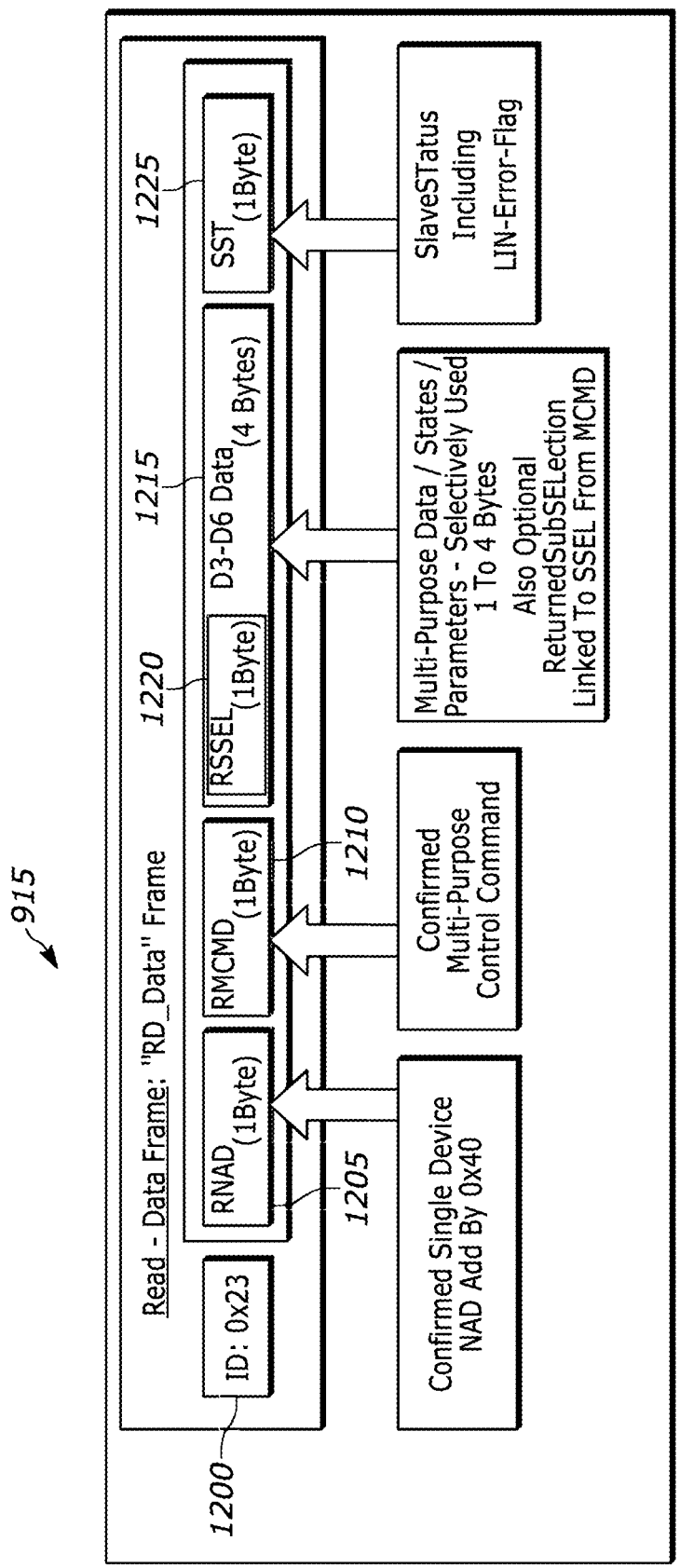
FIG. 12 is a diagram of a read data command frame, according to some examples.

Returning to FIG. 9, the example read data frame 915 includes seven bytes of data. While the write data frame 905 and the read data request frame 910 may be addressed to multiple smart motors 210, the read data frame 915 is addressed to a single smart motor 210. FIG. 12 provides a detailed read data frame 915 according to one example. The read data frame 915 includes an identification block 1200, a respond address block 1205, a respond command block 1210, a data block 1215, a return sub-selection block 1220, and a status block 1225. The identification block 1200 includes an identification code corresponding to a type of the frame being provided. For example, the identification code 0x23 shown in FIG. 12 indicates that the frame is a read data request frame. The respond address block 1205 indicates which smart motor 210 is transmitting the read data frame 915 (e.g., the returned node-address), and is implemented by the input device 110 and/or the one or more switches 115 to countercheck the location the command is performed. In some implementations, a value of 0x40 is added to the node-address to create the respond address block when the response is a positive response (e.g., no error has occurred while performing the command indicated by the write data frame 905). When the response is a negative response (e.g., an error has occurred while performing the command), the value of 0x40 is not added. Possible values of the respond address block 1205 range from 0x01 to 0x3F.

The respond command block 1210 indicates the action performed by the respective smart motor 210 (indicated by the respond address block 1210). Possible values of the respond command block 1210 range from 0x00 to 0xAF and 0xB8 to 0xFF. The data block 1215 includes data indicating parameters and options used while performing the command. While the example data block 1215 illustrated in FIG. 12 includes four bytes of data, the data block 1215 may include more or fewer bytes of data. In the example of FIG. 12, the data block 1215 also includes the return sub-selector block 1220, which serves as a sub-index for chained data selections. The status block 1225 includes data indicating a status of the respective smart motor 210, such as an "error" status, an "error in response" status, and a "successful transfer" status, among others.

Additional examples of data frames transmitted over the control bus 205 are illustrated in chart 1300 and legend 1310 of FIG. 13. The chart 1300 includes a header 1305 illustrating the contents of each byte in a data frame. For example, the write data frame 905 includes the frame ID 0x21, parity bits 0x01, and a PID value of 0x61. The write data frame 905 includes six bytes of data, including the node-address and the motor command. As indicated in the "Publisher" and "Subscriber" columns, the write data frame 905 is published (or transmitted) by a master device (e.g., the input device 110 and/or the one or more switches 115) and is subscribed (or received) by a slave device (e.g., one or more smart motors 210).

In the chart 1300, the read data request frame 910 includes the frame ID 0x22, parity bits 0x11, and a PID value of 0xE2. The read data request frame 910 includes three bytes of data, including the node-address and the motor command. As indicated in the "Publisher" and "Subscriber" columns, the read data request frame 910 is published (or transmitted) by a master device (e.g., the input device 110 and/or the one or more switches 115) and is subscribed (or received) by a slave device (e.g., one or more smart motors 210).

In the chart 1300, the read data frame 915 includes the frame ID 0x23, parity bits 0x10, and a PID value of 0xA3. The read data request frame 915 includes seven bytes of data, including the respond node-address, the respond motor command, and the device status. As indicated in the "Publisher" and "Subscriber" columns, the write data frame 915 is published (or transmitted) by a slave device (e.g., a smart motor 210) and is subscribed (or received) by a master device (e.g., the input device 110 and/or the one or more switches 115).

Communication may include additional types of commands, such as a sleep command (<GoToSleep_Cmd>) 1320. The sleep command may be broadcast on the control bus 205 such that each of the plurality of smart motors 210 receive the sleep command Communication may also include a controller reset command (<ECUReset_Cmd>) 1330 and a control reset response (<ECUReset_Response>) 1340 that relates to operations resetting each electronic processor 300. Additional operations not provided in the chart 1300 may also be performed by devices within the smart motor system 200. For example, a master device (e.g., the input device 110, the one or more switches 115) may broadcast commands to cutoff or stop a set of the smart motors 210. The master device may broadcast emergency protocols to be performed by the smart motors 210.

In some instances, commands for auxiliary output controls may be implemented by the smart motor system 200. For example, an auxiliary output control command includes functions controlled by master devices to control a plurality of auxiliary outputs. Such commands include, for example, controlling an output to switch between an on state and an off state, operating a seat heating system, performing diagnostic functions, and other auxiliary outputs. These outputs are described in more detail below with respect to FIG. 18.

In some instances, the plurality of smart motors 210 are configured to have local (e.g., on-device) power limiting functions. Each smart motor 210 may adjust the pulse width modulation (PWM) signal used to control their own current draw. Additionally, each smart motor 210 may shut itself down should the current draw exceed a current threshold. In some implementations, each smart motor 210 include the current draw in the status block 1225.

Figure 14:
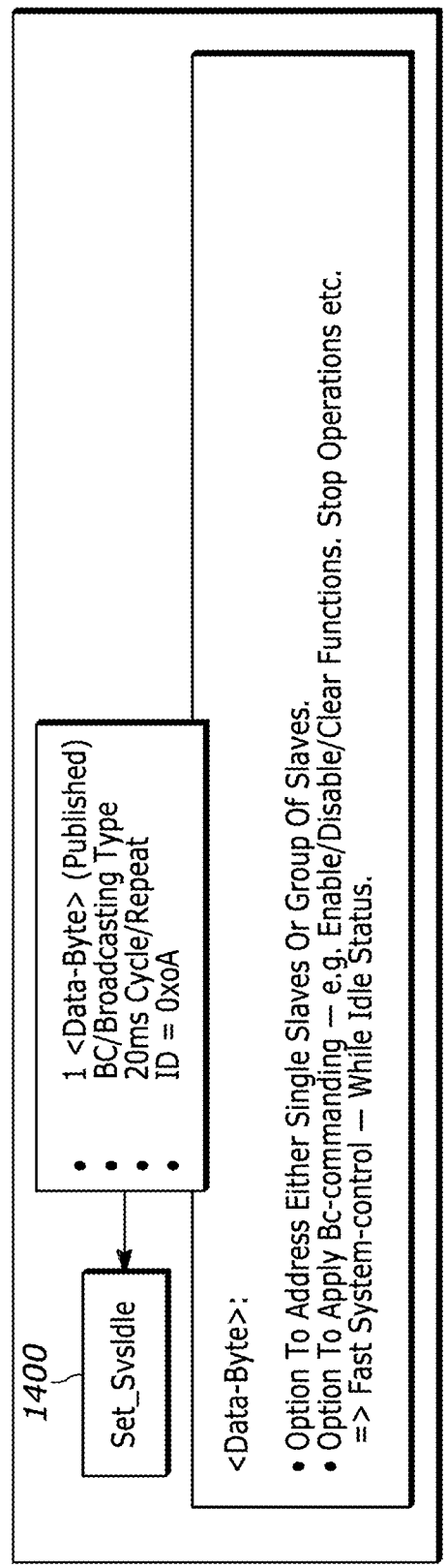
FIG. 14 is a diagram of an IDLE command frame, according to some examples.

FIG. 14 provides an example idle command 1400 transmitted over the control bus 205. The idle command 1400 includes a single byte of data and is broadcast to all of the plurality of smart motors 210 on the control bus 205. In some instances, the idle command 1400 is repeatedly transmitted at a set frequency, such as 20 milliseconds. The idle command 1400 minimizes traffic on the control bus 205 in instances no other control frames are needed. Functions of the idle command vary based on the identification code. For example, the idle command 1400 may clear some or all functions performed by the designated smart motors 210, may instruct the designated smart motors 210 to stop performing functions, may instruct the smart motors 210 to enter a low power mode, or the like. As the idle command 1400 is transmitted to every smart motor 210 connected on the control bus 205, the idle command 1400 ensures each smart motor 210 continues to receive some sort of data and do not go to sleep unless instructed.

Figure 15:
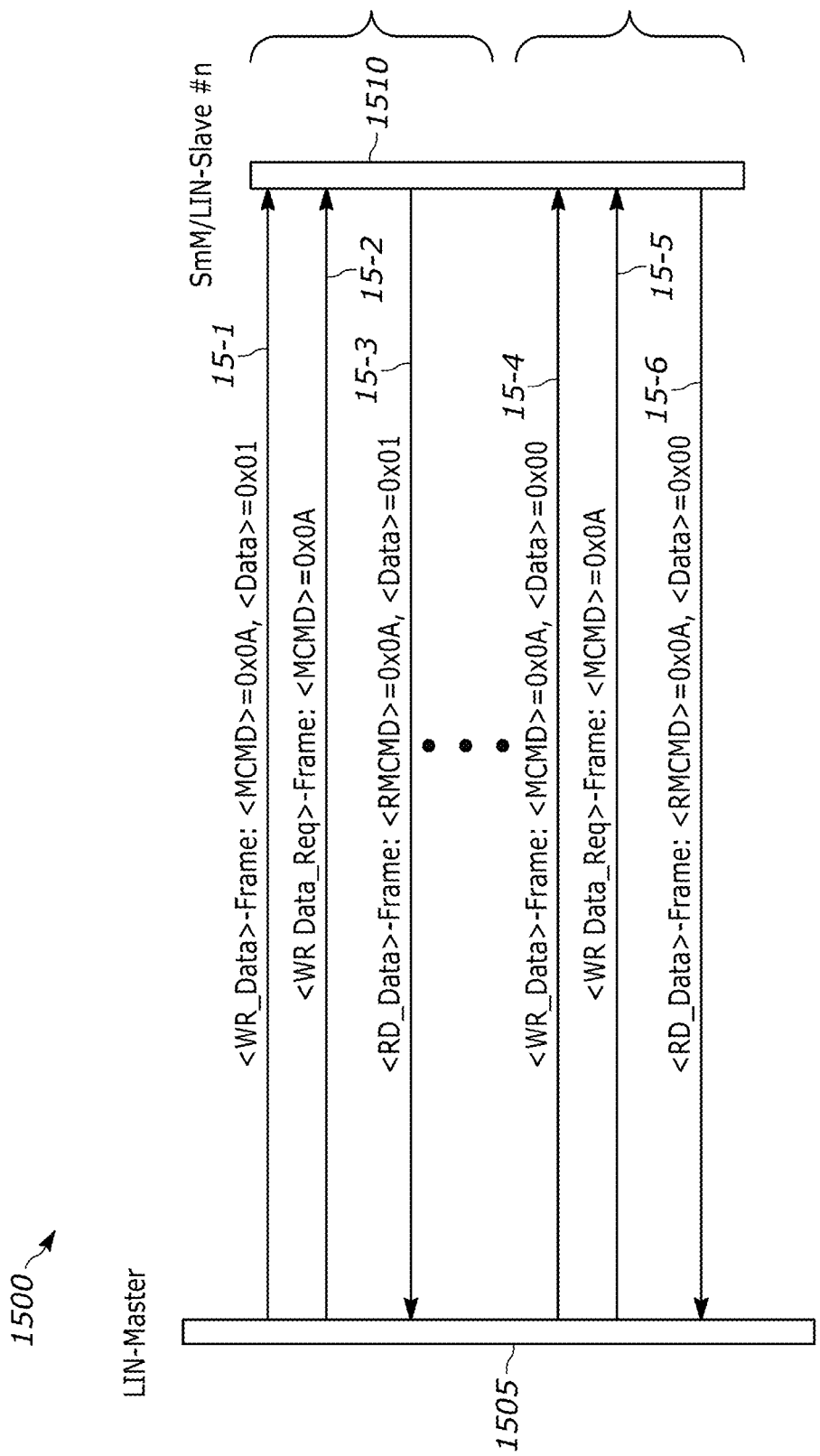
FIG. 15 is a diagram of a communication protocol conducted over the smart motor system of FIG. 2, according to some examples.

FIG. 15 provides an example communication cycle 1500 performed between a master device 1505 (e.g., the input device 110, one or more switches 115) and a slave device 1510 (e.g., a smart motor 210). In the communication cycle 1500, the slave device 1510 is performing a "momentary control" command in which the smart motor 210 is instructed to drive the motor 330. For example, the motor 330 is driven for the duration one of the one or more switches 115 is actuated.

At step 15-1, the master device 1505 transmits a write data frame (such as the write data frame 905) to the slave device 1510. The write data frame includes a data value of 0x01, indicating that the slave device 1510 is commanded to perform a driving operation (e.g., operating the motor 330 in clockwise or counter-clockwise). At step 15-2, the master device 1505 transmits a read data request frame (such as the read data request 910) to the slave device 1510. In response to the read data request frame, at step 15-3, the slave device 1510 transmits a read data frame (such as the read data frame 915) to the master device 1505. The read data frame indicates that the slave device 1510 is performing the momentary control command In some instances, the master device 1505 and the slave device 1510 continue to repeat step 15-2 and 15-3 for the duration of the momentary control operation.

At step 15-4, the master device 1505 transmits a second write data frame to the slave device 1510. The second write data frame includes a data value of 0x00, indicating that the slave device 1510 is commanded to stop performing the driving operation (or otherwise cease driving of the motor 330). At step 15-5, the master device 1505 transmits a read data request frame to the slave device 1510. In response to the read data request frame, at step 15-6, the slave device 1510 transmits a read data frame to the master device 1505. The read data frame indicates that the slave device 1510 has ceased operation of the motor 330 (e.g., is no longer performing the momentary control command).

Figure 16:
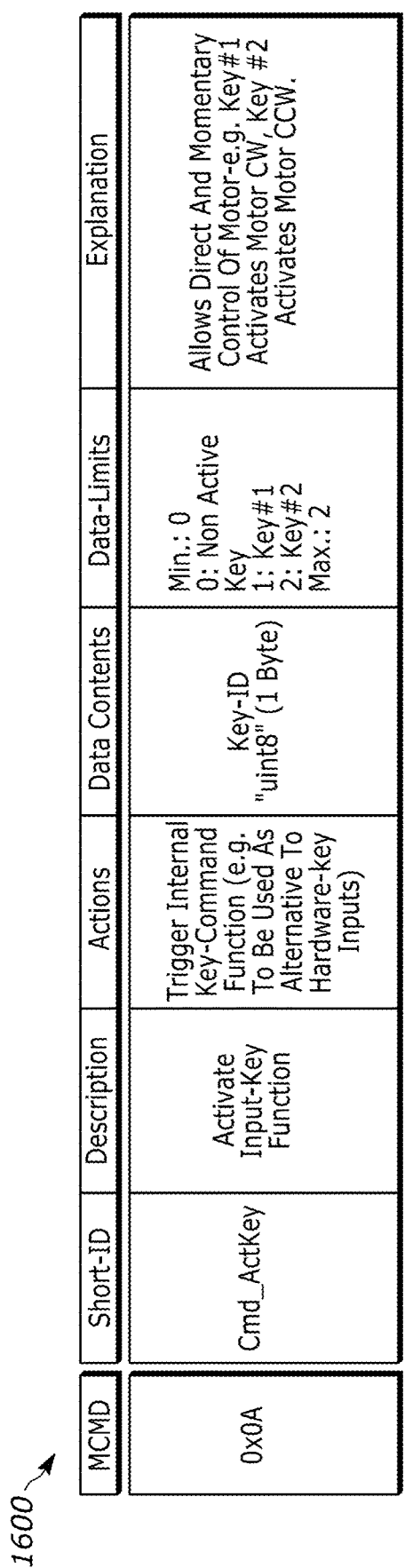
FIG. 16 is a chart of an example write data command frame, according to some examples.

FIG. 16 illustrates an example control frame 1600 transmitted by the input device 110 and/or the one or more switches 115 for the momentary control operation (e.g., an activate input-key function). The control frame 1600 defines the action to be taken and defines data limits, or parameters, for performing the function. For example, when the control frame 1600 indicates that key #1 is actuated, the motor 330 is driven in a clockwise direction. When the control frame 1600 indicates that key #2 is actuated, the motor 330 is driven in a counter-clockwise direction. FIG. 17 illustrates an example response frame 1700 transmitted by the smart motor 210 performing the momentary control operation. The response frame 1700 includes data indicative of operational states and stop states of the smart motor 210.

In some instances, while performing an operation, the smart motor 210 detects a failure to receive a read data request frame. Should the smart motor 210 fail to receive a read data request frame within a predetermined timeout period, the smart motor 210 may cease performing of the operation.

Figure 1:
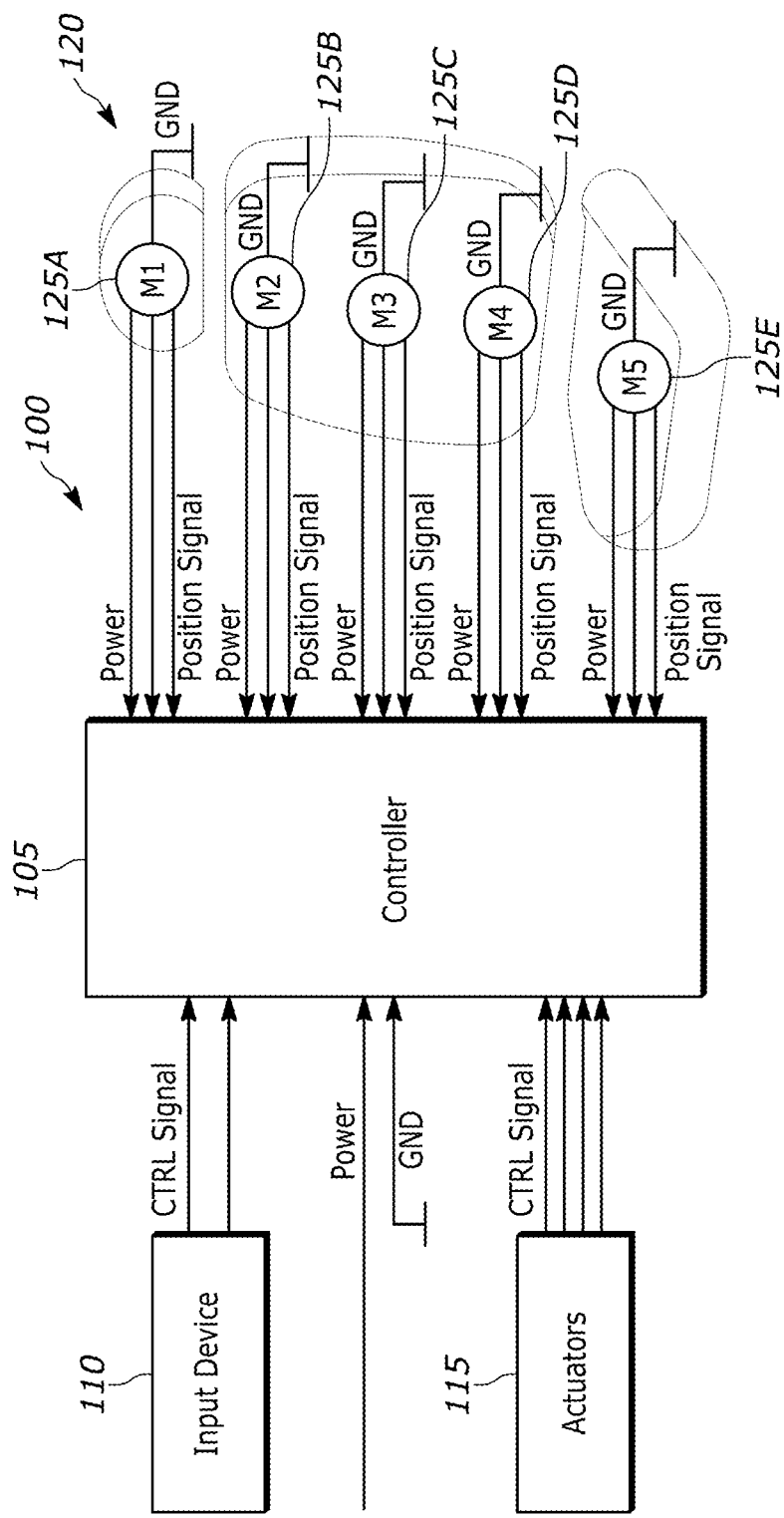
FIG. 1 is a schematic diagram of a known motor system.

The messaging protocol described above and local intelligence provided by software in the application layer 415 provide, among other things, advantages over the system shown in FIG. 1, including the ability to use a single smart motor architecture for multiple applications. For example, different programmed versions of same smart motor may be used for different purposes within a seat. For example, one smart motor may be programmed to control a head rest but an architecturally identical or similar motor with different or additional programming may be used to control a lumbar support. Thus, hardware specific motors are not needed for each different application. The same base smart motor may be used, and only software needs to be modified to perform a desired function. In addition, central control is not necessary. Messages may be sent on a bus and each smart motor has sufficient intelligence to interpret message intended for it and ignore messages intended for other smart motors or devices.

Figure 18:
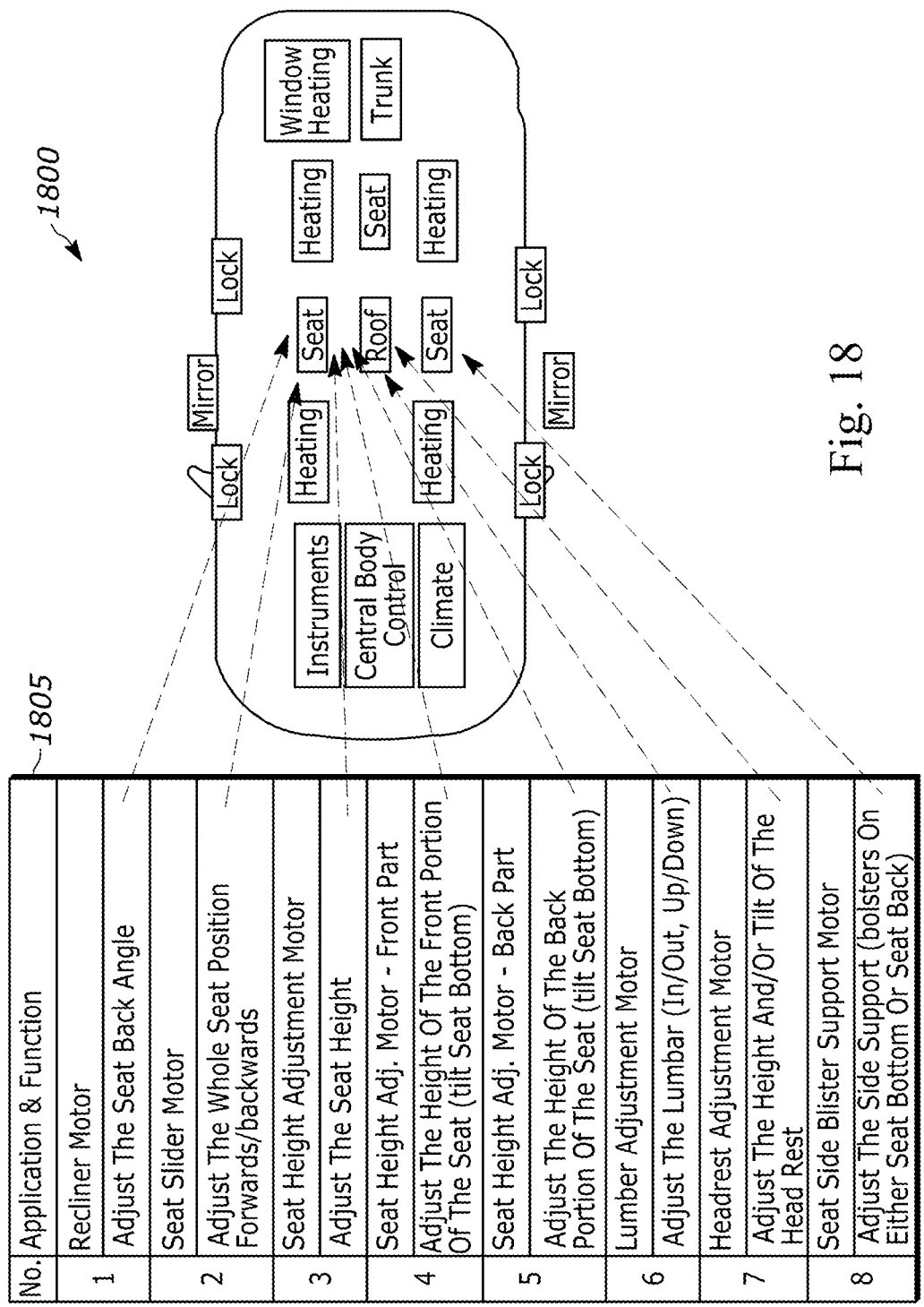
FIG. 18 is a plan view of a vehicle implementing a smart motor system, according to some examples.

While the smart motor system 200 has been primarily described with relation to the seat 120, the smart motor system 200 may be further expanded to account for additional motor uses. FIG. 18 provides a vehicular smart motor system 1800 providing a vehicle equipped with a plurality of smart motors. For example, the vehicular smart motor system 1800 includes a plurality of smart motors 1805, including a smart recliner motor configured to adjust the angle of a seat, a smart seat slider motor configured to adjust the position of the seat in a forwards and/or backwards manner, and a smart seat height adjustment motor configured to adjust the seat height. The plurality of smart motors 1805 includes front and back smart seat height adjustment motors to tilt the front and back portions of a seat, a smart lumbar adjustment motor to adjust a seat lumbar support, a smart headrest adjustment motor to adjust the height and/or tilt of a head rest, and a smart side bolster support motor to adjust the side support of a seat.

In addition to seat smart motors, the vehicular smart motor system 1800 may include smart motors to control a sunroof, side mirrors, a rearview mirror, and a trunk of the vehicle. In some instances, the smart motors are capable of controlling additional auxiliary components of the vehicular smart motor system 1800, such as climate control (for example, heating and cooling of the vehicle). While primarily described with respect to vehicles, the plurality of smart motors 210 may also be used in other systems and environments in which motors are used, such as, but not limited to, aircraft, buses, and trains.

Accordingly, aspects, feature, and embodiments described herein provide, among other things, smart motors and methods for control thereof. Various features and advantages of some examples are set forth in the following claims.

What is claimed is:

1. A smart motor, comprising:
   a motor;
   a memory; and
   an electronic processor connected to the motor and the memory, the electronic processor configured to
   receive, via a control bus, a command frame indicating an action, and
   perform the action by activating the motor for a time determined based on information from a signal received from an input device,
   wherein the electronic processor executes a software stack including a hardware layer, an operating layer, and an application layer,
   wherein the hardware layer provides input/output operations between the motor and the electronic processor,
   wherein the operating layer provides an intermediary between the hardware layer and the application layer,
   wherein the application layer executes functions stored in the memory to communicate with and control the hardware layer, and
   wherein the hardware layer, the operating layer, and the application layer selectively control operation of the motor based on the signal received from the input device.

2. The smart motor of claim 1, wherein the hardware layer further includes input/output operations for a motor driver.

3. The smart motor of claim 1, wherein the hardware layer further includes input/output operations between the electronic processor and a power conditioning circuit connected to the motor.

4. The smart motor of claim 1, wherein the hardware layer further includes input/output operations between the electronic processor and a sensor connected to the electronic processor.

5. The smart motor of claim 1, wherein the hardware layer further includes input/output operations between the electronic processor and a switch connected to the electronic processor.

6. The smart motor of claim 1, wherein the hardware layer further includes input/output operations between the electronic processor and the memory.

7. A smart motor, comprising:
   a motor;
   a memory; and
   an electronic processor connected to the motor and the memory, the electronic processor configured to
   receive, via a control bus, a command frame indicating an action, and
   perform the action, wherein performing the action includes activating the motor for a time determined based on information from a signal received from an input device,
   wherein the electronic processor executes a software stack including a hardware layer, an operating layer, and an application layer,
   wherein the hardware layer provides a plurality of input/output operations between the motor and the electronic processor,
   wherein the operating layer provides an intermediary between the hardware layer and the application layer, and
   wherein the application layer executes functions stored in the memory to communicate with and control the hardware layer.

8. The smart motor of claim 7, wherein the operating layer alters data received by the hardware layer for analysis by the application layer.

9. The smart motor of claim 7, wherein the operating layer includes an application programming interface input/output (API I/O) that acts as an intermediary between one or more physical components of the hardware layer and software within the application layer.

10. The smart motor of claim 9, wherein the API I/O includes a motor interface, a supply control interface, a sensor interface, a switch interface, a communication interface, or any combination thereof.

11. The smart motor of claim 7, wherein the operating layer includes an application programming interface non-volatile memory (API NVM) interface that acts as an intermediary between the memory and software of the application layer.

12. The smart motor of claim 11, wherein the API NVM interface includes an electrically erasable programmable read-only memory (EEPROM) API.

13. The smart motor of claim 12, wherein the API NVM interface further includes one or more NVM functions.

14. The smart motor of claim 13, wherein the API NVM interface further includes one or more EEPROM configuration operations.

15. A smart motor, comprising:
   a motor;
   a memory; and an electronic processor connected to the motor and the memory, the electronic processor configured to
  receive, via a control bus, a command frame indicating an action, and
  perform the action, wherein performing the action includes activating the motor for a time determined based on information from a signal received from an input device,
  wherein the electronic processor executes a software stack including a hardware layer, an operating layer, and an application layer,
  wherein the hardware layer provides a plurality of input/output operations between the motor and the electronic processor,
  wherein the operating layer provides an intermediary between the hardware layer and the application layer,
  wherein the application layer executes functions stored in the memory to communicate with and control the hardware layer, and
  wherein the memory includes one or more software instructions that are executable by the electronic processor to:
    receive a request for a status of the smart motor, and
    transmit the status of the motor.

16. The smart motor of claim 15, wherein the application layer further includes an application control module, an error handler module, a drive control module, an input/output control module, a communication control module, a system monitor module, a scheduler module, or a combination thereof.

17. The smart motor of claim 16, wherein the drive control module functions as a motor driver.

18. The smart motor of claim 16, wherein the application control module includes one or more primary applications, sub-applications, and application macros used to control the smart motor.

19. The smart motor of claim 16, wherein the application control module is configured to
  receive a command from a switch,
  analyze the command, and
  provide an output command the drive control module.

* * * * *